United States Patent [19]

Ying

[11] 4,161,777

[45] Jul. 17, 1979

[54] VISUAL OUTPUT MEANS FOR A DATA PROCESSING SYSTEM

[75] Inventor: Charles W. Ying, Andover, Mass.

[73] Assignee: Atex, Incorporated, Bedford, Mass.

[21] Appl. No.: 892,979

[22] Filed: Apr. 3, 1978

Related U.S. Application Data

[60] Division of Ser. No. 710,220, Jul. 30, 1976, which is a continuation of Ser. No. 508,358, Sep. 23, 1974, abandoned.

[51] Int. Cl.$^2$ .............................................. G06F 3/14
[52] U.S. Cl. ..................................................... 364/200
[58] Field of Search ..................... 364/200 MS File; 340/324 AD

[56] References Cited

U.S. PATENT DOCUMENTS

| | | | |
|---|---|---|---|
| 3,447,135 | 5/1969 | Calta et al. | 364/200 |
| 3,500,336 | 3/1970 | Cuccio et al. | 364/200 |
| 3,828,325 | 8/1974 | Stafford et al. | 364/200 |
| 3,833,930 | 9/1974 | Macker et al. | 364/200 |

Primary Examiner—Harvey E. Springborn
Attorney, Agent, or Firm—Cesari and McKenna

[57] ABSTRACT

A visual output assembly connects to a bus in a data processing system. The assembly includes a memory, plural visual display units and a multiplexing unit that connects to the bus, the memory and each visual display unit. Priority arbitration circuitry in the multiplexing unit receives request signals for access to the memory from the bus and from each of the visual display units. The priority arbitration circuitry controls address and data path switching circuits to establish appropriate address and data paths between the memory and the selected one of the bus and visual display units.

6 Claims, 3 Drawing Figures

VISUAL OUTPUT MEANS FOR A DATA PROCESSING SYSTEM

CROSS-REFERENCES TO RELATED MATERIALS

This application is a division of U.S. Patent application Ser. No. 710,220 filed July 30, 1976 which, in turn is a continuation of U.S. Patent application Ser. No. 508,358 filed Sept. 23, 1974 (now abandoned).

Reference also is made to:

U.S. Pat. No. 4,057,849 issued Nov. 8, 1977 for a TEXT EDITING AND DISPLAY SYSTEM which is incorporated herein by reference and which is assigned to the assignee of the invention, and U.S. Pat. No. 3,710,324 issued Jan. 9, 1973 for a DATA PROCESSING SYSTEM which is assigned to Digital Equipment Corporation.

BACKGROUND OF THE INVENTION

A. Field of the Invention

This invention relates to output display means for electronic text editing and display systems using a common bus, and comprises apparatus for establishing data transfers between memory and display units independently of the common bus, while retaining communication between those devices and the common bus when desired.

B. Prior Art

An electronic text editing and display system typically includes data input units for entering textual data to be displayed and edited; data display units for displaying the text; one or more memory units for storing the data to be displayed; an "editor" for correcting or modifying the data being displayed; and an output device that receives the edited text. Typically the display devices comprise cathode ray tubes (CRT's). These are limited persistence devices which require the repeated application of display data to maintain the display, and thus require frequent and massive data transfers from memory.

In one common type of system the memory and editor are incorporated within the data input device itself, as is the display device, to thereby form a self-contained "active" or "intelligent" terminal. These are quite expensive and thus their use is restricted to installations of substantial size which handle large amounts of data to be edited.

Another type of system uses a general purpose digital computer to interconnect one or more input devices with one or more output devices. The necessary data manipulation and control ("editing") functions are performed by the central processor, thereby enabling use of "passive" display devices which are quite expensive. In one form of such a system, all data transfers between the input devices and memory, or between memory and the display devices, take place through the system central processor. The latter constitutes an extensive burden on the central processor, and is especially wasteful in text editing and display systems which incorporate limited persistence display devices such as cathode ray tubes because of the necessity for frequent large scale data transfers between memory and the output display units for purposes of "refreshing" the display. Since such data transfers occupy a substanial portion of the central processor's available time, the number of display units which can be connected into the system is quite limited. These drawbacks can be partly alleviated by associating a captive memory with each display for display-refresh purposes, but this complicates the editing process and substantially increases the required memory capacity.

Some of the disadvantages of the foregoing system are avoided through use of an arrangement in which a common bus system connects the central processor, the memories, and all other units such as input/output units and display units. All data transfers between any of the units of the system, including the central processor, take place over this bus. One example of a common bus arrangement, commonly known as the "Unibus" TM system, is described in detail in U.S. Pat. No. 3,710,324. Briefly summarizing the salient features of that device, the common bus has a number of lines over which address, data and control information is transferred between the devices connected to the bus. All devices, including the central processor, memory, and the peripheral devices, use the same set of signals to communicate with each other; this is achieved in part by providing each device with a similar set of one or more control and status registers, as well as data registers, which utilize the common signal set for communication over the bus.

Each of the registers is directly addressable in the same manner as a memory location, and thus normal memory reference instructions can control all data transfers to and from the various devices; that is, the central processor can treat all other devices connected to the common bus as active memory locations and address them as such. This is a distinct improvement over the intra-system data transfer arrangements, but the number of display devices that can be connected to the bus without causing significant display degradation due to delays in obtaining bus access is quite limited, since only two devices at a time can communicate with each other over the bus.

Memory units having two access ports have heretofore been interposed between the common bus and the display units to thereby remove some of the data transfers in the system from the common bus. However, in such systems, data transfers from memory to memory, such as are often desired to enable a supervisor to monitor editing operations at the various display devices, pass through the central processor and thus burden it.

Accordingly it is an object of the invention to provide an improved text-editing and display system.

Further, it is an object of the invention to provide an improved text editing and display system which can accommodate a substantial number of displays without deterioration of the display quality.

Further, it is an object of the invention to provide a text-editing and display system incorporating a central processor which allows efficient use of the processor for text-editing operations, while accommodating a substantial number of displays.

Another object of the invention is to provide a text editing and display system which facilitates memory-to-display data transfers.

Still a further object of the invention is to provide an improved device interconnection arrangement within a digital computer system utilizing a common bus to connect system components, including the central processor and peripheral devices.

SUMMARY

In the present invention, I store the data to be displayed and edited in one or more random access (e.g.

magnetic core) memory units, each of which is of sufficient size to accommodate the display data for one or more display units. The memory units as well as the display units, are addressable from the common bus; thus data transfers involving a memory unit can take place over the common bus without involving the central processor. Further, I isolate data transfers between each memory unit and its associated display unit from the common bus by interposing a multiplexer between the common bus, on the one hand, and the memory and display units on the other. When either the memory unit or the display unit is to communicate with the central processor unit or other devices, the multiplexer connects the memory unit or the display unit, as the case may be, to the common bus and data transfer takes place over the bus. Thus, the memory data may be updated from an input terminal or from a device such as a disk memory unit connected to the common bus, or editing operations may be performed on it by the central processor.

On the other hand, data transfers from the memory unit to its associated display unit pass through the multiplexer directly from the memory to the display unit independently of the common bus. This frees the bus for use by other devices during this data transfer, and thus overcomes the most significant limitation of the common bus in multiple-terminal text editing systems, that is, its inability to accommodate simultaneous data transfers among various units in the system.

Isolating the data display units and their associated memory units from the common bus in this manner significantly increases the number of display devices that can be connected to the common bus, since most of the data transfers occur off the common bus. Thus the bus is freed for other data transfers. Specifically, it gives the processor faster access to the bus for data transfer with other memories not directly involved in display-refresh data transfers at a given time, so the processor spends less time waiting for the bus to be made available with a consequent increase in its efficiency. However, the flexibility of the common bus arrangement for transfers directly between peripheral, or "master" units and the memory units without involvement of the central processor is still preserved, and thus operations at any of the display units may be monitored remotely at a supervisor's station, also connected to the bus, without waiting for central processor servicing.

This invention is pointed out with particularity in the appended claims. The foregoing and other objects and features of the invention will be more readily understood by referring to the following detailed description taken in conjunction with the accompanying drawings.

BRIEF DESCRIPTION OF THE DRAWINGS

FIG. 3 is a circuit diagram of the transfer control circuit of FIG. 2.

DESCRIPTION OF A PREFERRED EMBODIMENT

Figure 1:
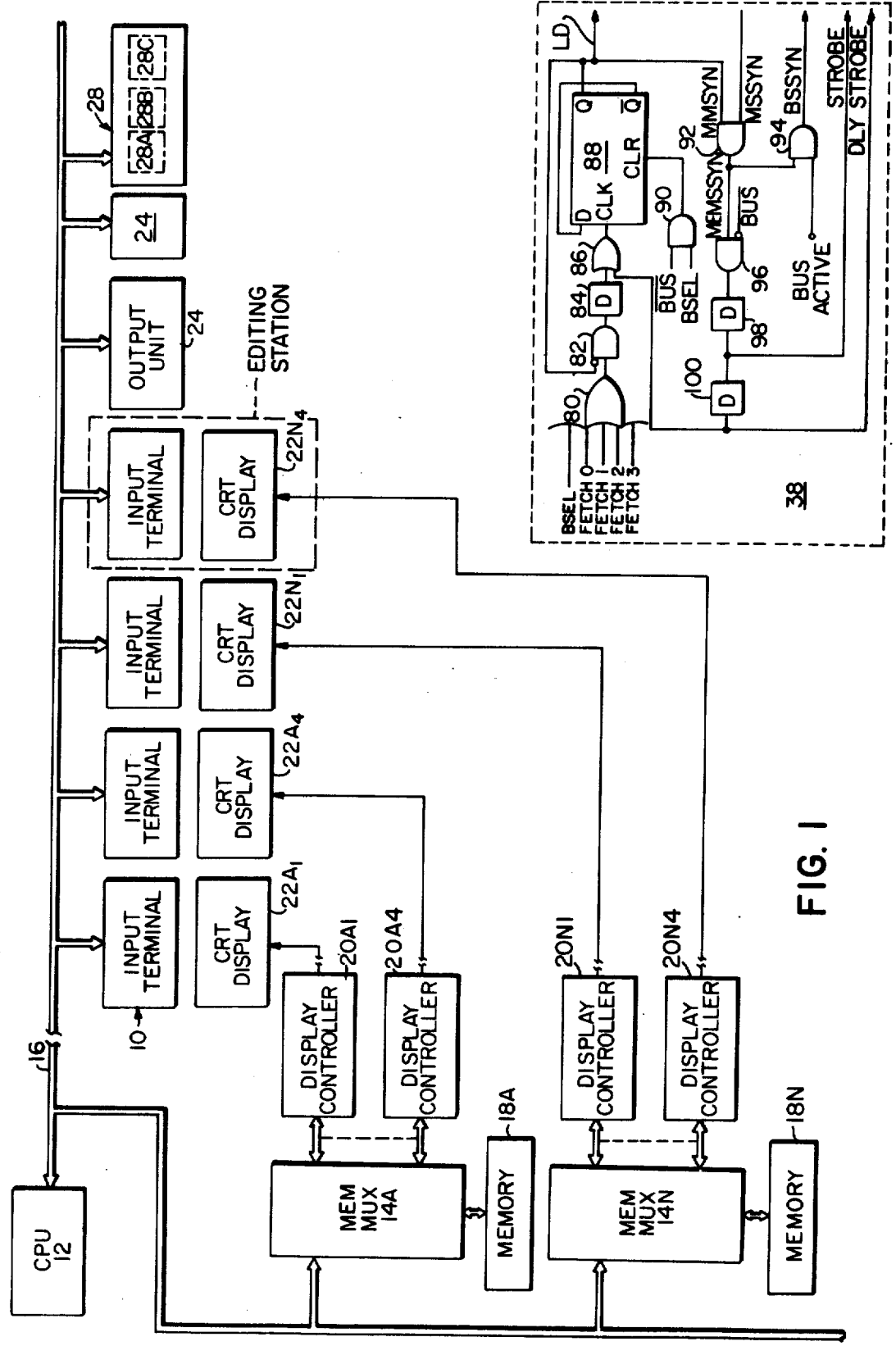
FIG. 1 is a block diagram of a text-editing and display controller in accordance with the present invention.

As shown in FIG. 1, the text-editing system of the present invention is formed from a number of input terminals 10, a central processor unit (CPU) 12 and a number of multiplexers, such as multiplexers 14A and 14N, all of which are connected to a common bus 16. In the following discussion I use the reference numeral "14" generally to designate the multiplexers and the reference numerals "14A" or "14N" to refer to a specific one of the multiplexers. The same convention is used in conjunction with later references to other elements that occur multiply in the drawings. Each multiplexer 14 has associated with it a corresponding one of memories 18A...18N and a number of display controllers such as controllers 20A1 through 20A4 connected to multiplexer 14A and controllers 20N1 through 20N4 connected to multiplexer 14N.

Each of the display controllers (e.g., 20A1, 20A4, 20N, and 20N4) connects to a corresponding CRT display (e.g., 22A1, 22A4, 22N1 and 22N4, respectively). Each CRT display generates a visual image of the data that is entered at a corresponding one of the input terminals 10. Generally a single input terminal 10 is associated with a single display unit 22 to form an "editing station". One or more output units 24 are connected to the bus 16 to receive the edited text.

A supervisory station 28 having a memory 28A and a display 28B, and a control 28C monitors the operations at the various editing stations. For compatibility, each unit connected to the bus, including the multiplexers, has a control and status register (CSR) which stores control information required for communicating with the unit, as well as one or more data registers (DR) that "buffer" or temporarily store the data being transferred to or from the unit. The registers, and thus the units themselves, are addressable by all other units connected to the bus as though they were memory locations, and thus any data transfer with them is performed by normal memory reference instructions.

For purposes of illustration, the input terminals 10 may be considered to comprise conventional keyboards containing the usual alphabetic, numeric, and punctuation keys, as well as control keys which allow the editing of text which is to be displayed on the corresponding display units 22. The data from these input terminals 10 is applied to the bus 16, together with an address which designates the device to which the data is to be transferred and one or more control bits indicating whether a data reading or writing operaion is to take place. The bus 16 is a bidirectional signal transfer device which allows a data transfer between any two devices connected directly to it, provided these devices have appropriate bus interface units incorporated in them. Such bus interface units are described in detail in the previously mentioned U.S. Pat. No. 3,710,324 and other related publications describing PDP11 data processing systems. For present purposes, it suffices to consider the bus as being comprised of a number of separate conductors that carry, respectively, device address signals, control signals and data signals. These lines, or conductors, are preferably all organized for parallel transfers and thus there is one line for each signal, or digital bit position, in the address, data and control signals.

The central processor unit 12 performs the required editing in response to inputs from the keyboard. For example, in response to these inputs, it may add or delete characters, words or lines, provide a display of upper-case, lower-case or italicized characters, and set up cursors to mark selected characters. In doing this, it communicates with the memories 18, as well as with the display controllers 20 over the common bus 16 through a corresponding one of the multiplexers 14. It also performs the usual "housekeeping" operations in the system, and may be available to perform functions wholly outside the text-editing and display system.

In a preferred embodiment, the central processor unit 12 comprises a PDP11 general purpose digital computer. This includes a bus controller which, among other functions, monitors bus operations, assigns use of the bus to various devices connected to it in accordance with their assigned priority levels, and interrupts use of the bus by these devices when a device having a higher priority requests bus access as described in the previously mentioned U.S. Pat. No. 3,710,324.

The memory multiplexers 14 provide the connections between the common bus 16, on the one hand, and the memories 18 and display controllers 20, on the other hand, for purposes such as display data entry, editing, or storage, as the case may be, as well as between the memories 18 and visual display assemblies that include the display units 22 and the display controllers 20 for refreshing the displays. They are involved in the two modes of transfer in the system. The first mode (between the bus 16 and a memory or between the bus 16 and a display controller) occupies the bus to the exclusion of units not involved in the data transfer, but generally takes little time in comparison with the second mode (between a memory and display controller) which occurs independently of the bus. Thus, accessibility of the bus for use by the central processor unit 12 is dramatically expanded and the efficiency of processor operations is correspondingly increased. As a result, a significantly larger number of displays can be accommodated in the system.

The memories 18 comprise random access memories such as magnetic core memories. They are shared by the display controllers 20, as well as by the central processor unit 12 and other devices connected to the common bus 16, and are addressable through the multiplexer 14. The data stored in these memories can be operated or in place by the processor during editing operations.

The display controllers 20 organize the data for display. Among other functions they periodically retrieve refresh-display data from their associated memories 18 and assemble this data in the desired format for display. The controllers each include a character generator which is compatible with the characteristics of the displays 22. Knowledge of the details of the precise structure of the controllers is not necessary for understanding the present invention and, accordingly, they will not be described here in further detail. A more detailed understanding of the construction and operation of a display controller, however, may be attained by referring to the previously mentioned U.S. Pat. No. 4,057,849.

It will be noted from FIG. 1 that each multiplexer has associated with it a single memory unit and several display units and their associated controller units, all of these elements constituting a display assembly for connection to the data processing system. The number of display units used in connection with each memory unit depends in the size of the display (i.e., the number of characters it can display at a given time) and the rate at which the display must be refreshed, as well as on the memory size. In the embodiment illustrated in FIG. 1, using a cathode ray tube (CRT) display unit capable of displaying up to 2,000 characters and requiring display refresh at a rate of sixty frames per second, an 8K (8192) word memory unit (using one word per character) readily accommodates four display units.

Figure 2:
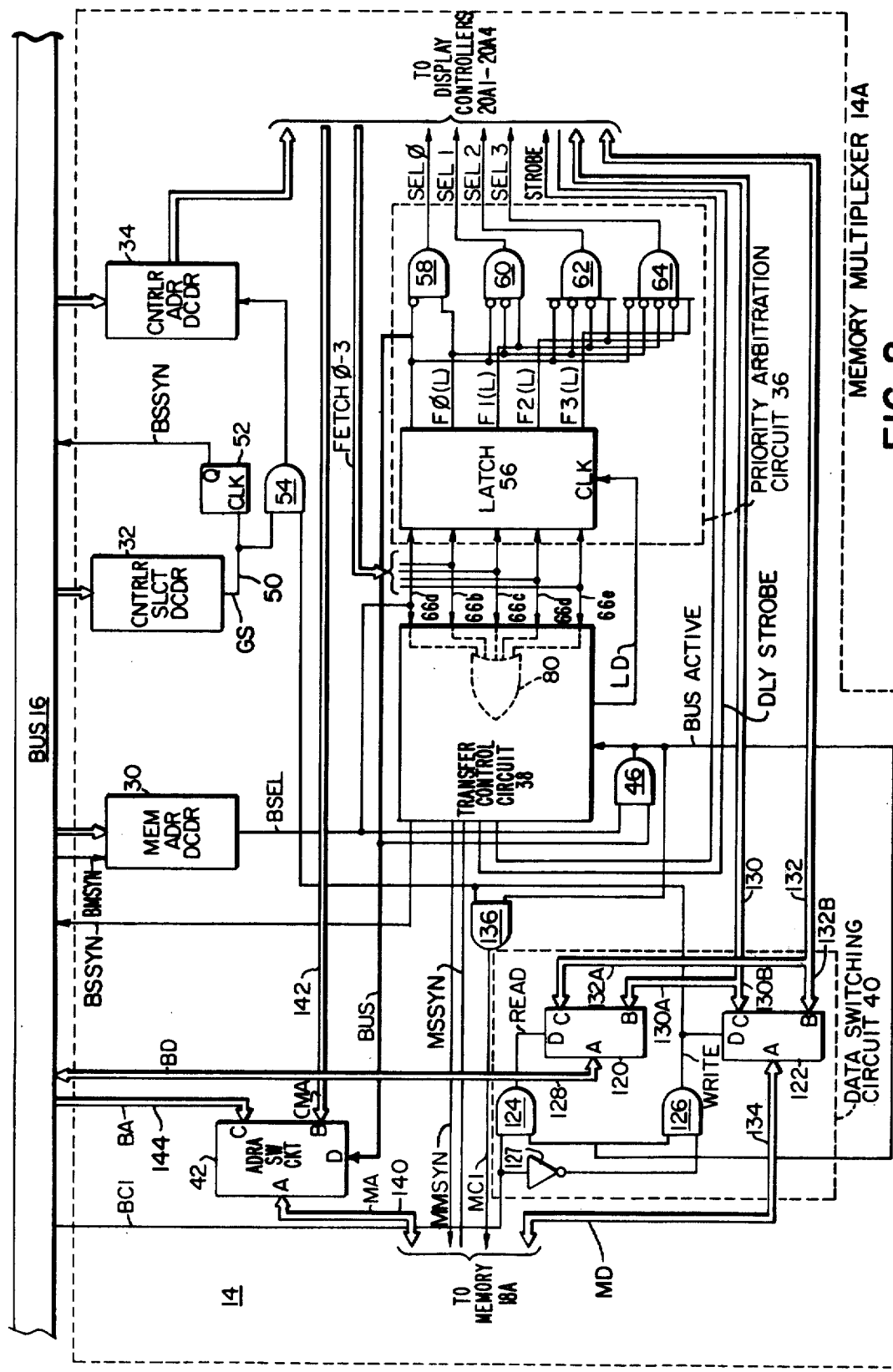
FIG. 2 is a block and line diagram of a memory multiplexer of FIG. 1.

FIG. 2 is a detailed block diagram of one of the memory multiplexers 14A; each memory multiplexer is constructed on a similar fashion. The multiplexer 14A includes a memory address decoder (MEM ADR DCDR) 30 which connects the memory 18A associated with the multiplexer 14A to the common bus 16 when the memory is addressed by the central processor unit 12; a controller select decoder (CNTR SLCT DCDR) 32 which selects a display controller connected to the memory multiplexer 14A to receive data from bus 16; a controller address decoder (CNTRLR ADR DCDR) 34 connects one of the display controllers to the common bus when the controller is addressed by the central processor unit 12; a priority arbitration circuit 36 which receives requests from the bus 16 and from the display controllers for data transfers to or from any of these or to or from memory and selects one of these units in accordance with a predetermined priority scheme; a transfer control circuit 38 which generates the signals which control the transfer of data between a memory 18 and the common bus 16 or the display controllers 20; a data switching circuit 40 which establishes the data transfer paths between the common bus 16, a memory 18 and selected display controller 20; and an address switching circuit 42 which couples the address lines of either common bus 16 or selected display controllers 20 to a memory 18.

The memory address detector 30 is connected to receive from the address conductors in the bus 16 address signals designating a location in one of memories 18 as the location to be connected to the bus 16 and a bus master synchronizing (BMSYN) signal designating the initiation of a data transfer operation by a master device on the bus 16, such as the central processor unit 12. In response, the memory address decoder 30 generates a bus selection (BSEL) signal if the address signals designate a location in the associated memory 18A which it applies to the priority arbitration circuit 36 to set up a connection between the associated memory 18A and the bus 16 when the priority level of this signal is reached. The BSEL signal also is coupled to the transfer control circuit 38 through AND gate 46. The transfer control circuit 38 responds to the BSEL signal by initiating a transfer with the memory and then generating a bus slave synchronizing (BSSYN) signal to the common bus 16 to indicate the completion of memory transfer operation. The transfer control circuit 38 also generates a memory master synchronizing (MMSYN) signal to initiate operations in the associated memory 18A.

On the other hand, if an associated display controller is constructed as shown in U.S. Pat. No. 4,057,849 and the address signals identify a storage location in an associated display controller, the controller select decoder 32 generates a group select (GS) signal on a lead 50 which sets a latch 52 thereby to apply to the bus 16 a bus slave synchronizing (BSSYN) signal that acknowledges the completion of a data transfer operation with the designated location. The group select signal is also applied to an AND gate 54 together with a WRITE signal derived from the bus 16. The output of gate 54 enables the controller address decoder 34 to select a particular location within the display controllers connected to the memory multiplexer 14 for accepting data from the bus 16.

Priority arbitration circuit 36 includes a multiple input latch 56 and a number of gates 58–64 having a single non-inverting input and one or more inverting inputs connected to receive selected outputs of the latch for generating the priority selection signals. Latch 56 has a number of input lines 66a–e which receive, respectively, the BSEL signal from the memory address decoder 30 and four FETCH signals (FETCH 0–3) from the respective display controllers 20A1 through 20A4; the FETCH signals are the requests of the corresponding display controllers for initiating a data transfer from the memory 14 into the corresponding CRT display 22. An LD signal to a clock (CLK) input of the latch 56 from the transfer control circuit 38 enters FETCH signals on the input lines; these signals then appear on latch output lines until receipt of the next clock signal.

The BUS output signal from the priority arbitration circuit 36 is equivalent to a latched bus selection (BSEL) signal and is generated whenever the BSEL signal is clocked into the latch 56. In other words, the BSEL signal is granted the highest priority. The SEL 0–3 signals are formed at the outputs of gates 58, 60, 62 and 64 from the latched FETCH 0–3 inputs, F0(L)–F3(L), respectively (the letter "L" designates a ground assertion signal). This is accomplished by applying the F0(L)–F3(L) outputs to the non-inverting inputs of gates 58, 60, 62 and 64, respectively and by applying the respective outputs to the inverting inputs of each gate of higher number than its own. For example, F1(L) is applied to the non-inverting input of gate 60, as well as to the inverting input of gates 58, 62 and 64. The latched BSEL signal from the latch 56 (i.e., the BUS signal) is also applied as an inverting input to all the gates.

The priority arbitration circuit 36 thereby establishes an order of priority for data transfers in which a transfer requested by the bus 16 has a highest priority and the FETCH 0–3 requests have successively lower priorities. The BUS signal is gated with the BSEL signal by AND gate 46 whose output is a BUS ACTIVE signal that is applied to transfer control circuit 38 along with the BUS signal to disable data transfers to the controller during the time the memory is connected to the bus.

The BUS ACTIVE signal is also applied to data switching circuit 40 to establish the data path for transferring data between the bus 16 and the memory 18A. The SEL 0–3 signals are applied to the respective display controllers to enable a data transfer from the memory 18A to the selected one of the display controllers 20A1 through 20A4.

Referring now to FIG. 3, the transfer control circuit 38 includes an OR gate 80 which receives the requests for access to memory either from the bus 16, represented by the BSEL signal, or from the display controllers represented by one of the FETCH signals. The output of the OR gate 80 is applied through a gate 82, a delay unit 84, and an OR gate 86 to the clocking input of a bistable element in the form of a D-type flip-flop 88.

More specifically, when the flip-flop 88 is cleared, the gate 82 is enabled to pass the signal from the OR gate 80 to its clocking input via delay circuit 84 and the OR gate 86. This signal sets flip-flop 88 thus disables gate 82. When the flip-flop 88 is set, it generates a memory master synchronizing (MMSYN) signal that triggers a memory operation and that also is designated as the LD signal for the latch 56 in FIG. 2. When the memory operation has been completed, the memory transmits a memory slave synchronizing (MSSYN) signal to the control circuit 38. The MMSYN and MSSYN signals energize an AND gate 92 to enable AND gates 94 and 96. It will be recalled that the BUS signal is the latched version of the BSEL signal and that the BUS ACTIVE signal represents the coincidence of the two. Thus, if the initiating signal applied to gate 80 is a BSEL signal while the BUS signal is not asserted, a gate 90 is energized to clear the flip-flop 88 thereby to enable the gate 82. In addition, gate 94 will be energized by the BUS ACTIVE signal and gate 96 disabled by the assertion of the BUS signal, so the control circuit 38 generates a bus slave synchronizing (BSSYN) signal which it applies to the common bus 16. If, on the other hand, the initiating signal at the OR gate 80 is one of the four FETCH signals, the gate 94 is disabled, but the gate 96 is energized. The output of gate 92 is thus applied through gate 96 to delays 98 and 100 to generate the STROBE and DLY STROBE signals, respectively. The DLY STROBE signal also is applied through circuit 86 to reset flip-flop 88. When the flip-flop 88 is reset, it enables the gate 82 to respond to the next memory access request.

Returning now to FIG. 2, the data switching circuit 40 comprises first and second bus switching elements 120 and 122, and corresponding AND gates 124 and 126, respectively. The switching elements 120 and 122 are solid state switches, each having data switching terminals A, B and C, and a control input terminal D. In response to control signals applied to their control input terminals from AND gates 124 and 126, respectively, they connect a set of data lines applied to terminal A of the switch to either of two other terminals B or C of the switch. In this respect, their function is similar to that of a number of ganged single pole, double-throw switches.

Specifically, the switching element 120 connects a set of data lines 128 applied to terminal 120A from the bus 16 to a corresponding set of data lines 130A connected to terminal 120B when the output of gate 124 is present, and connects the lines at terminal 120A to a set of data lines 132A connected to terminal 120C when the output of AND gate 124 is not present. Similarly, the switching element 122 receives a set of data lines 134 from the memory 18A at terminal 122A and connects these to a corresponding set of data lines 132B at terminal 122B when the output of AND gate 126 is present, and to a set of data lines 130B at terminal 122C when the output of AND gate 126 is not present. The data lines 130A and 130B are common with each other, as are the data lines 132A and 132B; further, they also are bidirectional, that is can carry data in either direction. Data lines 130A and 130B join to data lines 130 which carry data to the display controllers; similarly, data lines 132A and 132B join to data lines 132 which likewise carry data to the controllers. Data lines 130 carry data to certain initialization registers (margin width and scroll address registers) in the controller, while data lines 132 carry data from memory 18 to display line registers in the controllers; the data on these lines is entered in the controller only in response to specific LOAD commands. This is described in detail in my U.S. Pat. No. 4,057,849.

The AND gates 124 and 126 respond to the output of gate 46 and the BC1 signal from the bus 16. When data is to be retrieved from the memory 18A through the memory multiplexer 14A and transmitted onto the bus 16 (i.e., a reading operation), the AND gate 124 generates a READ signal. When a writing operation is to occur, the AND gate 126 generates a WRITE signal. The selection is controlled by a BC1 signal that is asserted to indicate a reading operation. In the absence of a BUS ACTIVE output signal from gate 46, the AND gates 124 and 126 both are disabled and bus data lines 128 are thus connected to data lines 132A at terminal 120C, while memory data lines 134 are connected to data lines 130B at terminal 122C. This establishes data transfer paths between the display controllers and the bus 16 via data lines 128 and 130, as well as between the display controllers and the memory 18A via data lines 134 and 132.

When the BUS ACTIVE signal is present at the output of AND gate 46, AND gates 124, 126 and 136 respond to the BC1 signal from the bus 16 and the WRITE signal from the gate 126. In the absence of a READ signal on bus 16, switching element 122 connects memory data lines 134 to controller data lines 132B, while switching element 120 connects bus data lines 128 to controller data lines 132A. This provides bus access to memory for writing operations. The WRITE output of gate 126 and the BUS ACTIVE signal energize the gate 136 to thereby condition the memory for writing in response to the output (MCI) of gate 136.

Conversely, when a READ signal is present on bus 16, switching element 120 connects bus data lines 128 to controller data lines 130A while switching element 122 connects memory data lines 134 to controller data lines 130B. This provides bus access to memory for reading operations during which data is transferred to the bus 16 from the memory.

An address switching circuit (ADRA SW CKT) 42 comprises a solid state analog of a multi-pole double throw switch. It connects memory address lines 140 at terminal A to either controller memory address (CMA) lines 142 at terminal B or to bus address (BA) lines 144 at terminal C dependent on the status of a control signal applied to terminal D. In the absence of a BUS signal at terminal D, switching circuit 42 connects memory address lines 140 to display controller address lines 142; thus, the controller addresses memory with the current memory address (CMA) of a character which is to be retrieved for display. However, when a BUS signal is present at terminal D, the switching circuit 42 connects the memory address lines 140 to the bus address lines 144 to thereby provide bus access to memory for a reading or writing operation.

The operation of the memory multiplexer during data transfers within the system will now be described for each mode of data transfer.

DATA TRANSFER TO OR FROM THE COMMON BUS 16

Data is transferred either between the common bus 16 and the memory 18A or between the display controller 20 and the memory 18. First, consider a request by the central processor unit 12 for access to modify. Specifically, consider a READ request. To initiate the data transfer from memory, the central processor unit 12 generates a bus master synchronizing (BMSYN) signal, and the address of the selected memory unit onto the bus 16. The multiplexer 14 associated with the addressed memory responds by generating a MMSYN signal. In addition, the address switching circuit 42 of multiplexer 14 connects the address lines of bus 16 to the memory address terminals and the data switching circuit 40 applies the bus data lines to the data terminals of memory unit 18.

The multiplexer 14 also responds to signals on the bus 16 by applying an MC1 signal to the memory unit 18. Thus, the data and address paths are now established to enable a data transfer from memory unit 18 to the processor 12 over the bus 16. The cycle is completed when the memory 18 transmits the MSSYN signal thereby to enable the multiplexer 14 to generate the BSSYN signal.

The processor 12 also transfers data to the display controllers associated with a multiplexer 14. To initiate this transfer, the central processor unit 12 generates the bus master synchronizing (BMSYN) signal and the address of the selected multiplexer onto bus 16. Decoder 32 in multiplexer 14 responds to these signals and returns the BSSYN signal to the central processor unit 12. It also enables the decoder 34 so that the display controller 20 can receive data from bus 16. Concurrently, data switching circuit 40 connects the data lines of bus 16 to the display controller data inputs so the central processor unit 12 can transfer data into the selected display controller.

REFRESH DISPLAY DATA TRANSFERS

To initiate a display refresh transfer from memory, a display controller 20 generates a FETCH signal which is received by the multiplexer 14. In response, the multiplexer 14 transmits an MMSYN signal to memory and returns a SELECT signal to the highest priority display controller requesting data. The memory unit 18 transfers data, from a location defined by the controller memory address, or CMA, signals from the display controller which are conveyed to the memory unit 18 via the switching circuit 42. The data retrieved from memory is then entered into the controller data registers on transmission of the STROBE signal to the controllers from the multiplexer in response to the receipt of the MSSYN signal from the memory.

CONCLUSION

From the foregoing it will be seen that I have provided an improved text editing system. The system removes the time-consuming display-refresh data transfers from the common bus, while retaining rapid access between the various memory units in the system; this is accomplished with little or no involvement of the central processor unit.

It will be clear to those skilled in the art that various changes may be made from the foregoing without departing from either the spirit or the scope of the invention and it is intended that such changes to be encompassed herein, the scope of the invention being defined with particularity in the attached claims.

I claim:

1. Visual display assembly means for use with a digital data processing system that includes a bus and means for a generating onto the bus system address and system transfer control signals to produce a transfer of system data signals over the bus, said display assembly means comprising:
    A. a memory for storing data signals at identified storage locations therein, said memory producing a transfer of data with a said storage location therein in response to memory address signals that identify that said storage location uniquely in the data processing system and memory tranfer control signals,
    B. a plurality of visual display means for producing visual images corresponding to data stored in said memory, each said visual display mean including a display data connection for receiving data signals, display address means for generating display address signals and display transfer means for generating display transfer control signals thereby to initiate a data transfer with said corresponding visual display means, C. multiplexing means connected to said memory and said plurality of visual display means, said multiplexing means including:
   i. bus connection means connectible to the bus for coupling the system address signals, the system transfer control signals and the system data signals between the bus and said multiplexing means,
   ii. priority arbitration means connected to said bus connection means and to said display transfer means in each said visual display means for responding to the transfer control signals from said connection means and each said visual display means thereby to designate whether a transfer of data signals with said memory will occur through the said bus connection means or with one of said visual display means,
   iii. transfer control means connected to said bus connection means and to said display transfer control means and responsive to the system address and system transfer control signals from said bus connection means and to the display transfer control signals from said visual display means for generating the memory transfer control signals that initiate a data transfer operation by said memory,
   iv. address path switching means connected to said memory, said bus connection means, said display address means and said priority arbitration means and responsive to said priority arbitration means for coupling, to said memory, memory address signals corresponding to the selected ones of the system signals and the display address signals, and
   v. data path switching means connected to said bus connection means and to said display data connections for each of said visual display means for transferring data signals between said memory and the one of said visual display means and said bus connection means that is selected by said priority arbitration means.

2. Visual display assembly means as recited in claim 1 wherein:
   ii. said priority arbitration means includes:
      a. latching circuit means connected to said display transfer means for storing the status of the transfer control signals, and
      b. gating circuit means connected to said latching circuit and responsive to the output signals from said latching circuit for generating a selection signal that enables one of said display means and said bus connection means to participate in an ensuing data signal transfer, and
   iii. said transfer control means includes means connected to said display transfer means and to said latching circuit and responsive to each of the transfer control signals for generating a signal that loads the transfer control signals into said latching circuit.

3. Visual display assembly means as recited in claim 1 wherein the memory transfer control signals include a memory master synchronizing signal for initiating a transfer in said memory and a memory slave synchronizing signal generated by said memory upon a completion of the data transfer and wherein said transfer control means includes:
   a. first means connected to said bus connection means, said display transfer means and said memory and responsive to the receipt of any one of the transfer control signals from said bus connection means and said display means for generating the memory master synchronizing signal, and
   b. second means connected to said memory and to said first means and responsive to the memory master synchronizing signal and the memory slave synchronizing signal from said memory for terminating the memory master synchronizing signal.

4. Visual display assembly means as recited in claim 3 wherein:
   i. said bus connection means includes address decoding means connectible to the bus and responsive to the system address signals for asserting a bus selection control signal that controls the establishment of the address and data signal paths by said address path switching means and said data path switching means, and
   ii. said transfer control means includes third means connected to said address decoding means, said priority arbitration means and second means in said transfer control means and responsive to the bus selection control signal for generating a bus slave synchronizing signal, said bus connection means coupling the bus slave synchronizing signal to the bus thereby to signal the completion of any transfer of data signals initiated by the system transfer signals.

5. Visual display assembly means as recited in claim 4 wherein said second means in said transfer control means comprises strobe means responsive to said first means in said transfer control means when the bus selection control signal is not asserted for generating a strobing signal, the strobing signal being coupled to said plurality of visual display means, only said visual display means designated by said priority arbitration means responding to the strobing signal by loading the data from said memory.

6. Visual display assembly means as recited in claim 5 wherein each said visual display means has a first data connection for receiving data signals from said memory for display and a second data connection for transferring data signals through said bus connection means for control, said bus connection means including:
   a. a second address decoding means connectible to the bus and responsive to the system address signals for enabling the transfer of data with said second data connection means in response to the bus transfer signals, and
   b. means connected to said second address decoding means for generating a bus slave synchronizing signal for indicating a completion of each successive data transfer to the digital data processing system.

* * * * *

UNITED STATES PATENT AND TRADEMARK OFFICE
CERTIFICATE OF CORRECTION

PATENT NO. : 4,161,777
DATED : July 17, 1979
INVENTOR(S) : Charles W. Ying

It is certified that error appears in the above-identified patent and that said Letters Patent are hereby corrected as shown below:

Column 1, line 15, "invention, and" should be --invention.--
Column 1, line 54, "expensive" should be --inexpensive--.

Column 5, line 38, "or" should be --on--.
Column 6, line 3, "on" should be --in--.
Column 6, line 12, "34 connects" should be --34 which connects--
Column 6, line 28, "detector" should be --decoder--.
Column 9, line 54, "modify" should be --memory--.
Column 10, line 64, "mean" should be --means--.
Column 11, line 28, after "memory," there should be a new paragraph.

Signed and Sealed this

Tenth Day of June 1980

[SEAL]

Attest:

SIDNEY A. DIAMOND

Attesting Officer

Commissioner of Patents and Trademarks